J. B. MARTIN.
TYPE WRITER.
APPLICATION FILED AUG. 1, 1910.

974,164.

Patented Nov. 1, 1910.
2 SHEETS—SHEET 1.

John B. Martin,
Inventor

Witnesses by C. A. Snow & Co.
Attorneys

UNITED STATES PATENT OFFICE.

JOHN BAPTIST MARTIN, OF HAHNVILLE, LOUISIANA.

TYPE-WRITER.

974,164.     Specification of Letters Patent.     Patented Nov. 1, 1910.

Application filed August 1, 1910. Serial No. 574,787.

*To all whom it may concern:*

Be it known that I, JOHN B. MARTIN, a citizen of the United States, residing at Hahnville, in the parish of St. Charles and State of Louisiana, have invented a new and useful Type-Writer, of which the following is a specification.

This invention has reference to improvements in typewriters and its object is to provide a means whereby the carriage of the typewriter will be automatically returned to initial position at the completion of a line and the platen will be moved axially a suitable distance for line spacing.

In accordance with the present invention there is provided an electric motor which at a proper time is energized by a suitable current source and causes the movement of the carriage in a direction opposed to the ordinary carriage spring, and there is provided mechanism whereby at the end of the return movement of the carriage the platen is given a partial turn. Provision is also made whereby the current to the motor is cut off when the carriage arrives at its initial position and the circuit is not again completed until the line has been written. By this means the operator has not to pay any attention to either returning the carriage or moving the platen for line spacing but can give entire attention to the writing, thus economizing time.

The invention will be best understood from a consideration of the following detailed description taken in connection with the accompanying drawings forming a part of this specification, in which drawings:—

Figure 1:
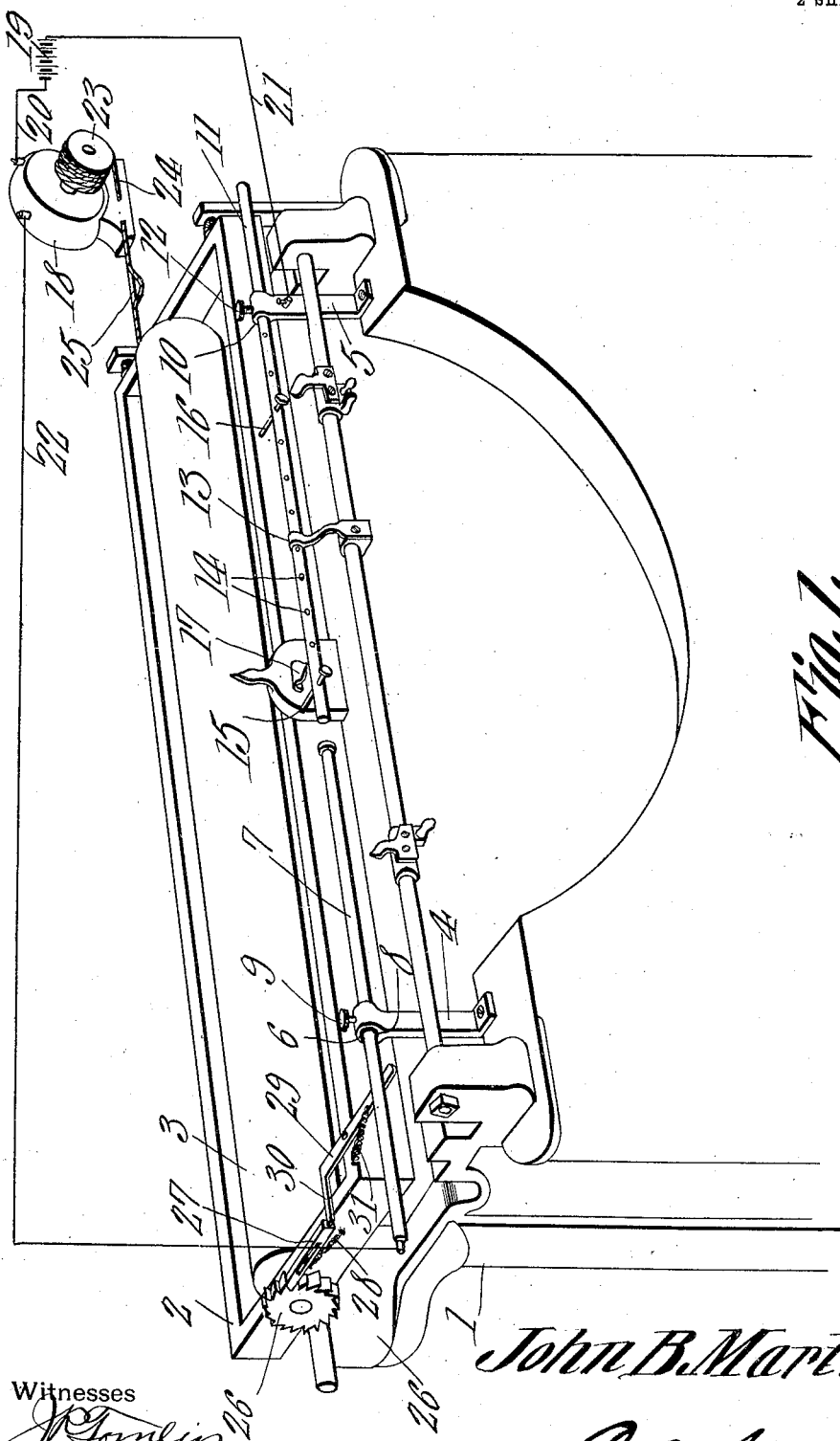
Figure 2:
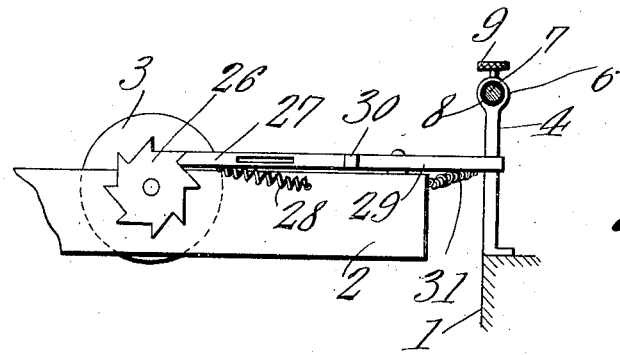
Figure 3:
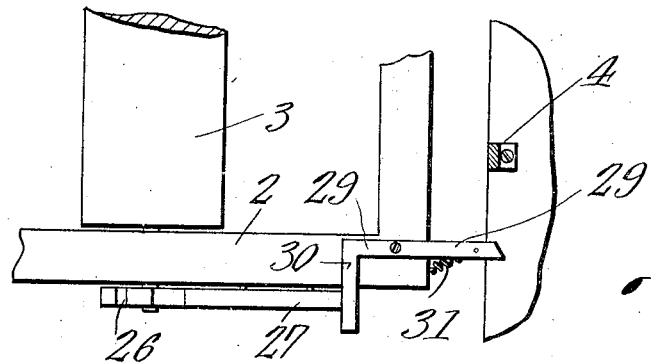
Figure 4:
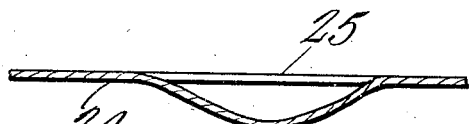

Figure 1 is a perspective view of the invention as applied to a typewriter, the showing being in part diagrammatic. Fig. 2 is an end view of the carriage carried mechanism for turning the platen. Fig. 3 is a plan view of the structure of Fig. 2. Fig. 4 is a detail view showing a means for preventing shock as the mechanism is energized for the return of the carriage to its initial position.

Referring to the drawings there is shown a frame 1 which may be taken as typical of any of the ordinary styles of typewriters, the present invention being adaptable with slight changes to any of the standard makes of typewriters without material change in the structure of either the typewriting machine or the present invention.

The frame of the typewriter shown is that of the Underwood typewriter, but it will be understood that this showing is only indicative and that the invention is by no means confined to the particular make of typewriters mentioned. There is also shown in Fig. 1 a carriage 2 with the platen 3 mounted therein. These structures are also to be taken as simply indicative since the showing would vary with different types of machine. In the drawings the mounting of the carriage and other parts which do not enter into the present invention have been omitted.

Mounted on the frame 1 at opposite ends thereof are two standards 4, 5 respectively. The upper end of the standard 4 is formed into a bearing 6 traversed by a metallic rod 7, but the rod 7 is electrically insulated from the post or standard 4 by a sleeve 8 of insulating material within the bearing 6. A set screw or thumb screw 9 in the bearing 6 serves to hold the rod 7 in adjusted position. The upper end of the post or standard 5 is formed into a bearing 10 traversed by a metallic rod 11 held in place by a thumb or set screw 12 carried by the bearing 10. The rod 11 is further carried by another bearing 13 serving to guide the rod and this rod is also provided with a series of spaced perforations 14 for the reception of pins 15 and 16 for a purpose which will presently appear. On the carriage is a stop member 17 participating in the movements of the carriage and this stop member 17 is designed to engage the pins 15 and 16 in a manner and for a purpose which will presently appear. The rods 7 and 11 are in alinement one with the other and the rod 7 is customarily fixed against movement but may be adjusted longitudinally at will. The rod 11 is capable of longitudinal movement under conditions to be described and may be brought into engagement with the rod 7 or may be moved out of engagement therewith.

At a convenient point there is located a small electric motor 18 which may receive current from a battery 19 or other source of current which battery is connected on one side by a conductor 20 to one side of the motor and on the other side by a conductor 21 to the post or standard 5. The other side of the motor 18 is connected by a conductor 22 to the rod 7 at the end remote from the rod 11. The arrangement is such that when the rod 11 is brought into engagement with the rod 7 there is established an electric circuit from the battery 19 by the conductor 21 to the post 5 then to the rod 11 and from the latter to the rod 7 returning by way of the conductor 22 to the motor 18 and from the latter by the conductor 20 to the battery 19. Whenever the rod 11 is brought into engagement with the rod 7 this circuit is completed and the motor is energized. The armature shaft of the motor carries a winding drum 23 connected by a cord or strand 24 to the carriage 2 and the arrangement is such that when the motor is energized the strand 24 is wound on the drum 23 and the carriage 2 is moved in the appropriate direction, which direction is toward the right as is customary in typewriting machines when it is desired to return the carriage to the initial position after a line or part of a line has been written.

Since the inertia of the carriage offers large resistance to the motor in starting the strand 24 has connected in it at an appropriate point an elastic section 25, best shown in Fig. 4, so that there is a certain amount of slack in the strand 24 and when the motor is started this slack will be taken up before the strand 24 will act on the carriage 2 thus relieving the motor 18 from the work of starting the carriage at once, although the actual time interval in practice is very small. At one end of the shaft of the platen 3 is the usual ratchet wheel 26 under the control of a sliding pawl 27 carried by the corresponding portion of the carriage 2, this pawl or slide being under the normal control of a spring 28.

Mounted on the carriage 2 is a lever 29 having one end provided with an angle extension 30 adapted to engage the corresponding end of the slide 27. This lever 29 is under the normal control of a spring 31 and the end remote from the angle end 30 is so positioned as to engage the post 4 under conditions to be described.

Let it be assumed that the pins 15 and 16 have been placed in appropriate holes 14 in the rod 11 so that the pin 16 when the carriage 2 is in its initial position will be engaged by the stop member 17 on the carriage with the adjacent ends of the rods 7 and 11 separated. The operator actuates the typewriter in the usual manner and the carriage 2 is fed toward the left as usual, the strand 24 unwinding from the drum 23, the armature of the motor yielding readily since the motor is not energized. The movement of the carriage 2 toward the left continues as the typewriter is operated until ultimately the stop member 17 is brought into contact with the pin 15 when the rod 11 participates in the further movement of the carriage until ultimately the rod 11 is brought into contact with the rod 7 and the electric circuit already described is established through the motor 18 thus energizing the latter and causing it to operate. This results in the carriage 2 being rapidly drawn to the initial position at which point the stop member 17 contacts with the pin 16 and the rod 11 is moved out of electrical engagement with the rod 7 and the circuit is ruptured, the motor stopping. Just prior however to the carriage 2 reaching the initial position under the action of the motor 18, the lever 29 is brought into engagement with the post 4 and so moved thereby as to cause the end 30 to engage the pawl 27 in a manner to move the latter against the spring 28 and turn the platen 3 the required distance for a line space. The relation of the lever 29 to the post 4 may be such that the lever will ultimately snap by the post and when the carriage 2 is again actuated in the forward direction the lever 29 will again move by the post 4 in the opposite direction but idly so far as its action on the driving pawl 27 is concerned. The line spacing lever will be modified for other types of machine, but generally the form shown will answer. The automatic return of the carriage will occur each time the rods 7 and 11 are brought together and this may be readily determined by the relative positions of the pins 15 and 16 to each other and to the stop member 17. If it be desired to determine the position of the lines upon the paper, the rod 7 may be adjusted in the post 4 and cramped by the thumb screw 9 in the new position and the length of the line is readily determined by the distance between the pins 15 and 16.

What is claimed is:—

1. In a typewriter, an electric motor for returning the typewriter carriage to the initial position, and two contact members includable in circuit with the motor, one contact member being adjustable to and from the other, and the other contact member being movable by the carriage into and out of engagement with the first named contact and provided with adjustable means for determining the time of actuation of said movable contact by the carriage.

2. In a typewriter, an electric motor for returning the typewriter carriage to the initial position, and two contact rods includable in circuit with the motor, said rods being in alinement one with the other and one of said rods being provided with a series of spaced perforations with removable pins adapted thereto, and an actuating member on the carriage of the typewriter adapted to
5 engage either of the pins to move the rod into or out of engagement with the other rod.

In testimony that I claim the foregoing as my own, I have hereto affixed my signature in the presence of two witnesses.

JOHN BAPTIST MARTIN.

Witnesses:
LEAV C. VIAL,
DANA A. MARTIN.